(12) United States Patent
Mao et al.

(10) Patent No.: US 12,719,973 B2
(45) Date of Patent: Aug. 25, 2026

(54) PORTABLE DEVICE

(71) Applicant: AAC Technologies (Nanjing) Co., Ltd., Nanjing (CN)

(72) Inventors: Lubin Mao, Nanjing (CN); Yulei Zhang, Nanjing (CN); Lijin Zhang, Nanjing (CN); Yun Tang, Nanjing (CN); Yajun Zheng, Nanjing (CN); Jie Ma, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 291 days.

(21) Appl. No.: 18/525,791

(22) Filed: Nov. 30, 2023

(65) Prior Publication Data

US 2024/0406297 A1 Dec. 5, 2024

Related U.S. Application Data

(63) Continuation of application No. PCT/CN2023/096709, filed on May 29, 2023.

(51) Int. Cl.
*H04M 1/02* (2006.01)
*G08B 6/00* (2006.01)
*H02K 33/18* (2006.01)

(52) U.S. Cl.
CPC .............. *H04M 1/026* (2013.01); *G08B 6/00* (2013.01); *H02K 33/18* (2013.01)

(58) Field of Classification Search
CPC .......... H04M 1/026; G08B 6/00; H02K 33/18
See application file for complete search history.

(56) References Cited

U.S. PATENT DOCUMENTS 10,610,892 B2 * 4/2020 Takahashi ............. H04M 1/026
11,024,135 B1 * 6/2021 Ostdiek .................... G08B 6/00
2011/0255260 A1 * 10/2011 Weber .................... H01H 13/04 200/341
2019/0151894 A1 * 5/2019 Takahashi ............. H04M 1/026
2021/0159815 A1 * 5/2021 Kim ....................... H02N 2/026
2021/0398402 A1 * 12/2021 Richards .................. G08B 6/00

(Continued)

OTHER PUBLICATIONS

Park, Chaeyong, et al. "Augmenting physical buttons with vibrotactile feedback for programmable feels." Proceedings of the 33rd Annual ACM Symposium on User Interface Software and Technology. 2020. (Year: 2020).*

*Primary Examiner* — Nathan A Mitchell
(74) *Attorney, Agent, or Firm* — Wiersch Law Group

(57) ABSTRACT

A portable device, including a frame, a button fixed relative to the frame, a connection member fixedly connecting the button to the frame, a sensor for detecting a pressing state of the button, and a vibration motor fixed below the button. The frame has a mounting hole penetrating therethrough; the frame includes an outer side surface and an inner side surface opposite to the outer side surface; the button is mounted on the outer side surface; the mounting hole penetrates through the outer side surface and the inner side surface; the vibration motor is suspended in the mounting hole; and the connection member is of a hollow ring structure and is fitted and fixed to the edge of the button. When the button vibrates, the vibration is not transferred to other areas of the portable device, thereby achieving better area vibration and more realistic experience for pressing the button.

10 Claims, 4 Drawing Sheets

(56) References Cited

U.S. PATENT DOCUMENTS

| | | | | |
|---|---|---|---|---|
| 2021/0398403 | A1* | 12/2021 | Ostdiek | G08B 6/00 |
| 2023/0086204 | A1* | 3/2023 | Amin-Shahidi | H02K 33/02 310/15 |
| 2023/0408984 | A1* | 12/2023 | Liang | G08B 6/00 |
| 2025/0111974 | A1* | 4/2025 | Amin-Shahidi | H01H 13/14 |

* cited by examiner

PORTABLE DEVICE

CROSS-REFERENCE TO RELATED APPLICATIONS

This application is a continuation of International Application No. PCT/CN2023/096709, filed on May 29, 2023, which is hereby incorporated by reference in its entirety.

TECHNICAL FIELD

The present disclosure relates to the technical field of vibration feedback, and in particular, to a portable device.

BACKGROUND

The vibration feedback technology can reproduce the touch feeling for the user through a series of actions such as acting force and vibration. This mechanical stimulus may be applied to assisted creation and control of virtual scenes or virtual objects in computer simulations, as well as to enhance remote manipulation of machines and apparatus.

However, existing vibration feedback products generally have diffusion in a tactile feedback area and insufficient precision of tactile feedback, thereby affecting the user experience.

In view of this, the present disclosure provides a new portable device to solve the above-mentioned technical problems.

UTILITY MODEL CONTENT

An object of the present disclosure is to provide a portable device, with a precise vibration area of tactile feedback and a more realistic tactile feedback experience.

In an aspect, an embodiment of the present disclosure provides a portable device, including: a frame; a button fixed relative to the frame; a connection member fixedly connecting the button to the frame; a sensor for detecting a pressing state of the button; and a vibration motor fixed below the button. The frame is provided with a mounting hole penetrating through the frame, the frame includes an outer side surface and an inner side surface opposite to the outer side surface, the mounting hole penetrates through both the outer side surface and the inner side surface, the button is mounted on the outer side surface, the vibration motor is suspended in the mounting hole, and the connection member is of a hollow ring structure and is fitted and fixed to an edge of the button.

As an improvement, the connection member is an elastic piece or a silicone pad.

As an improvement, the connection member includes a pair of long axial edges and a pair of short axial edges, and a width of each of the pair of short axial edges is greater than a width of each of the pair of long axial edges.

As an improvement, the vibration motor includes a housing fixed relative to the button, a coil fixed to the housing, a vibrator suspended in the housing, and an elastic connection part elastically connecting the vibrator to the housing.

As an improvement, an end of the elastic connection part carries the vibrator, another end of the elastic connection part is connected to the housing, and a vibrating direction of the vibrator is parallel to a direction of a pressing force for pressing the button.

As an improvement, the vibrator includes a mass block and a magnet assembly fixed to the mass block, and the magnet assembly partially extends into the coil.

As an improvement, a side of the elastic connection part is fixedly connected to the vibrator, another side of the elastic connection part is fixedly connected to the housing, and a vibrating direction of the vibrator is perpendicular to a pressing force for pressing the button.

As an improvement, the vibrator includes a mass block and a magnet assembly fixed to the mass block, the coil includes a pair of flat coils, and the magnet assembly is arranged above the coil.

As an improvement, the sensor is of a sheet structure and is clamped between the vibration motor and the button.

DESCRIPTION OF EMBODIMENTS

The technical solutions in embodiments of the present disclosure will be described below in connection with the drawings in the embodiments of the present disclosure, and it is apparent that the embodiments described herein are merely a part, not all of the embodiments of the present disclosure. All other embodiments obtained by those of ordinary skill in the art based on the embodiments of the present disclosure without creative efforts shall fall within a scope of the present disclosure.

Figure 1:
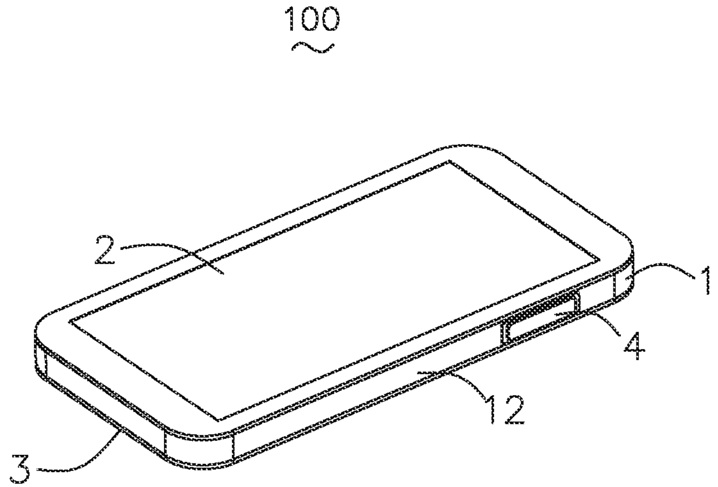
FIG. 1 is a perspective view of a portable device according to an embodiment of the present disclosure.
Figure 2:
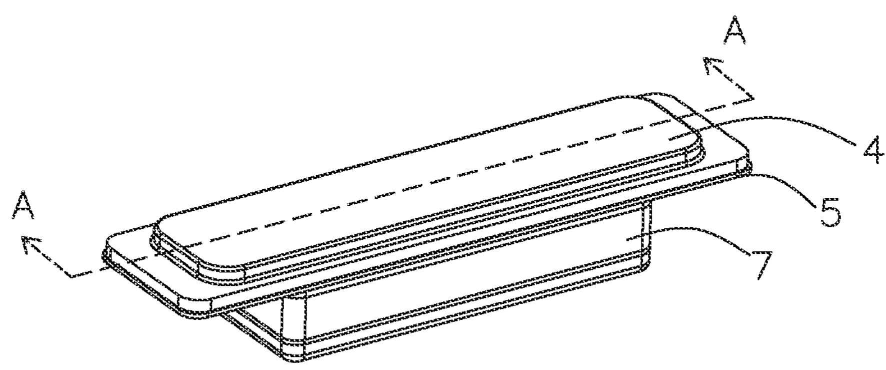
FIG. 2 is a perspective view of a partial structure of a portable device according to a first embodiment of the present disclosure.
Figure 3:
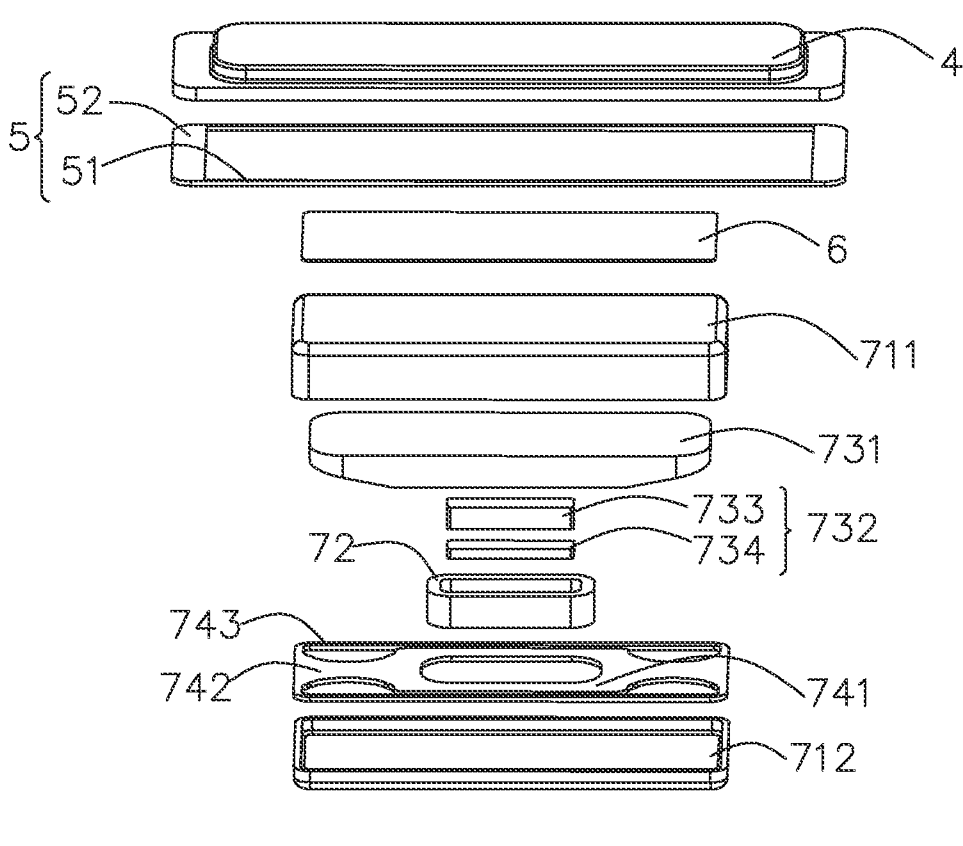
FIG. 3 is an exploded view of a partial structure of the portable device shown in FIG. 2.

Referring to FIG. 1 to FIG. 3, an embodiment of the present disclosure provides a portable device 100, which can be a mobile phone, a watch, smart glasses, a smart handle, or other devices. The present disclosure will be described in details by using a mobile phone as an example.

The portable device 100 includes a frame 1, a screen 2 fixed on a side of the frame 1, a rear cover 3 fixed on another side of the frame 1, a button 4 fixed relative to the frame 1, a connection member 5 for fixedly connecting the button 4 to the frame 1, a sensor 6 for detecting a pressing state of the button 4, and a vibration motor 7 fixed below the button 4.

Figure 4:
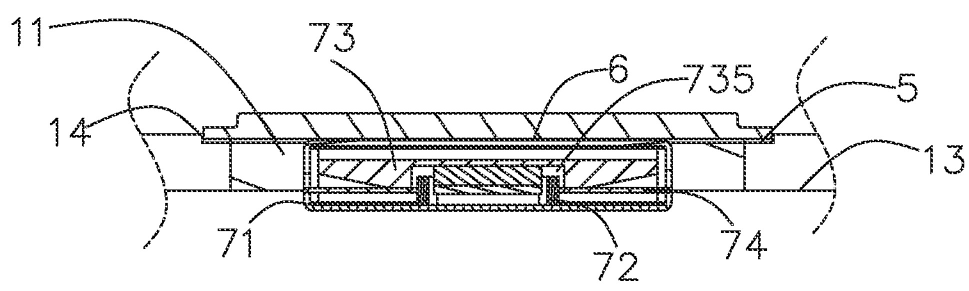
FIG. 4 is a cross-sectional view of a partial structure of the portable device shown in FIG. 2 being mounted on a frame along A-A.

As shown in FIG. 2 to FIG. 4, the frame 1 is provided with a mounting hole 11 penetrating through the frame 1, the frame 1 includes an outer side surface 12 and an inner side surface 13 opposite to the outer side surface 12, and the mounting hole 11 penetrates through the outer side surface 12 and the inner side surface 13. The outer side surface 12 has a recess 14. The button 4 is fitted and fixed to the recess 14 of the outer side surface 12 and protrudes from the outer side surface 12 of the frame 1. The vibration motor 7 is suspended in the mounting hole 11.

The connection member 5 is a hollow ring structure and is fitted and fixed to an edge of the button 4. The connection member 5 is an elastic piece or a silicone pad, or the connection member 5 is made of other materials capable of providing rigidity and damping. The connection member 5 includes a pair of long axial edges 51 and a pair of short axial edges 52, and a width of each of the short axial edges 52 is greater than a width of each of the long axial edges 51.

In this embodiment, the sensor 6 is of a sheet structure and is clamped between the button 4 and the vibration motor 7. In other embodiments of the present disclosure, the sensor 6 may have another shape/be of another structure and may be mounted at another position of the portable device 100. The sensor 6 is configured to detect position information and strength information of a pressing force received by the button 4.

The vibration motor 7 drives the button 4 to vibrate through inertial vibration, and meanwhile, the button 4 is connected to the frame 1 of the portable device 100 through the connection member 5, so that vibration will not be transferred to other areas of the portable device 100, thereby achieving a clear area vibration.

Further referring to FIG. 2 to FIG. 4, a first embodiment of the present disclosure is shown. The vibration motor 7 includes a housing 71 fixed relative to the button 4, a coil 72 mounted and fixed to the housing 71, a vibrator 73 suspended in the housing 71, and an elastic connection part 74 elastically connecting the vibrator 73 to the housing 71. A vibrating direction of the vibrator 73 is parallel to a direction of the pressing force for pressing the button 4. The vibrator 73 is fixed to the sensor 6 and the button 4 only through the housing 71. The connection member 5 is disposed around the vibration motor 7.

The housing 71 includes an upper housing 711 and a lower housing 712 covering the upper housing 711, and the coil 72 is fixed to the lower housing 712. The vibrator 73 includes a mass block 731 and a magnet assembly 732 fixed to the mass block 731, and the magnet assembly 732 includes a magnet 733 and a pole plate 734 fitted and fixed to a side of the magnet 733 close to the coil 72. The lower surface of the mass block 731 is recessed to form a recess 735, and the magnet assembly 732 is located in the recess 735. The magnet assembly 732 partially extends into the coil 72. A thickness of the mass block 731 gradually decreases along a direction from a center of the mass block 731 towards an edge of the mass block 731.

The elastic connection part 74 is of a sheet structure. An end of the elastic connection part 74 carries the vibrator 73, and another end of the elastic connection part 74 is connected to the housing 71. For example, the elastic connection part 74 includes a first fixing portion 741 supporting a partial lower surface of the mass block 731, a second fixing portion 742 clamped between the upper housing 711 and the lower housing 712, and a connecting portion 743 for connecting the first fixing portion 741 to the second fixing portion 742.

Figure 5:
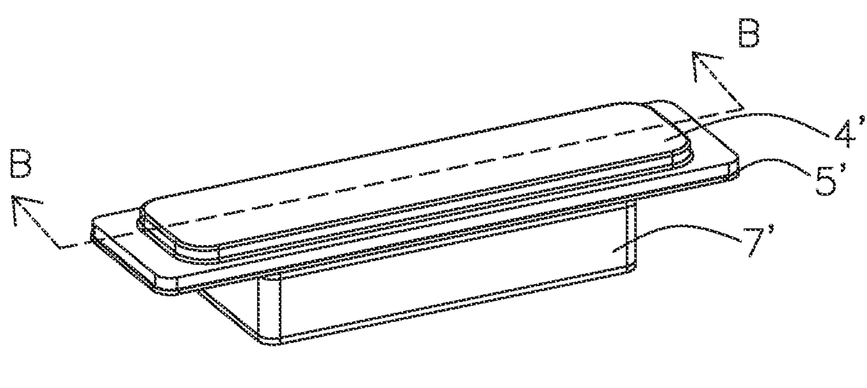
FIG. 5 is a perspective view of a partial structure of a portable device according to a second embodiment of the present disclosure.
Figure 6:
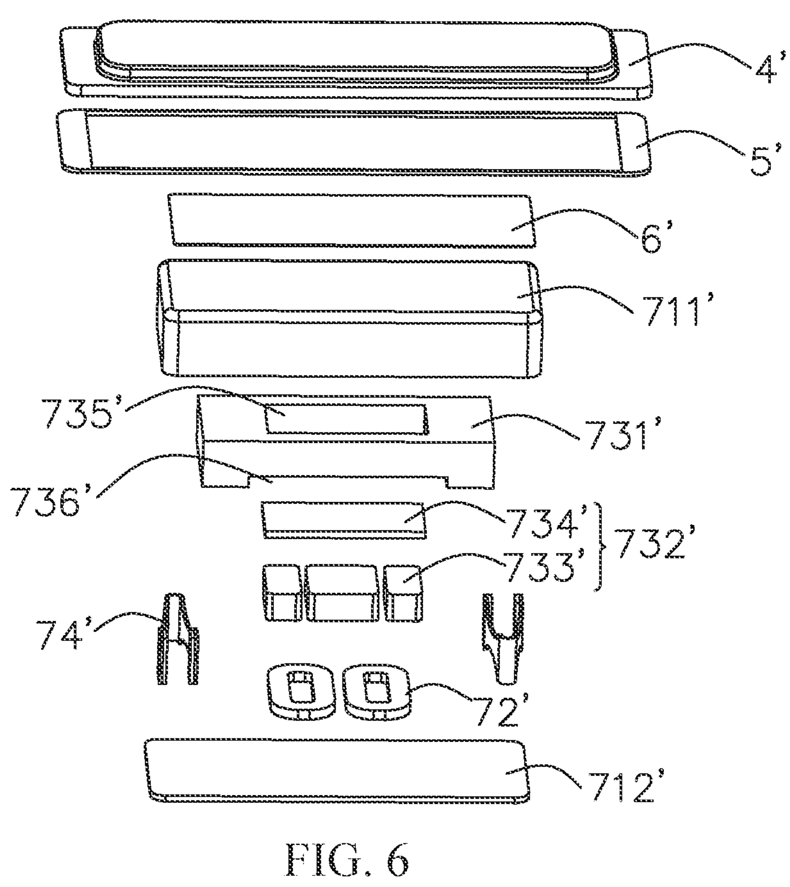
FIG. 6 is an exploded view of a partial structure of the portable device shown in FIG. 5.
Figure 7:
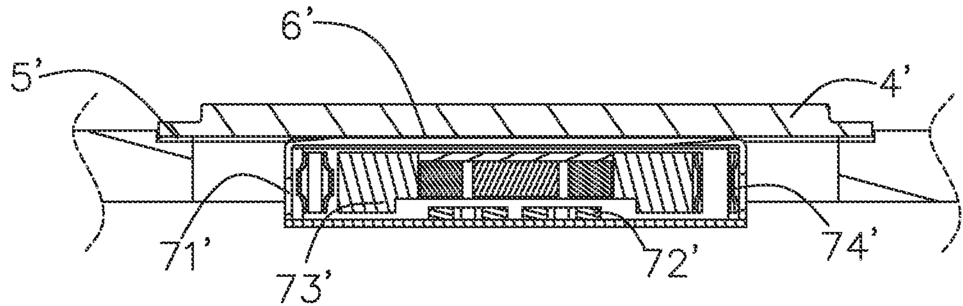
FIG. 7 is a cross-sectional view of a partial structure of the portable device shown in FIG. 5 being mounted on a frame along B-B.

As shown in FIG. 5 to FIG. 7, a second embodiment of the present disclosure is shown. The vibration motor 7' includes a housing 71' fixed relative to a button 4', a coil 72' mounted and fixed to the housing 71', a vibrator 73' suspended in the housing 71', and an elastic connection part 74' elastically connecting the vibrator 73' to the housing 71'. A vibrating direction of the vibrator 73' is perpendicular to a direction of a pressing force for pressing the button 4'. The vibrator 73' is fixed to the sensor 6' and the button 4' only through the housing 71', and the connection member 5' is disposed around the vibration motor 7'.

The housing 71' includes an upper housing 711' and a lower housing 712' covering the upper housing 711', the lower housing 712' is of a plate-shaped structure, and the coil 72' is fixed to the lower housing 712'. The coil 72' is a pair of flat coils. The vibrator 73' includes a mass block 731' and a magnet assembly 732' fixed to the mass block 731', and the magnet assembly 732' is disposed above the coil 72'. The magnet assembly 732' includes a magnet 733' and a pole plate 734' fitted and fixed to a side of the magnet 733' close to the button 4'. The mass block 731' is provided with a through hole 735' penetrating through the mass block 731' and an avoiding portion 736' communicating with the through hole 735' for avoiding the coil 72'. The magnet assembly 732' is located in the through hole 735', and the pole plate 734' is fitted and fixed to the upper housing 711'.

The elastic connection part 74' is of a V-shaped structure or a U-shaped structure. A side of the elastic connection part 74' is fixedly connected to the vibrator 73', and another side of the elastic connection part 74' is fixedly connected to the housing 71'.

Compared with the related art, the portable device provided by the present disclosure includes: a frame; a button fixed relative to the frame; a connection member fixedly connecting the button to the frame; a sensor for detecting a pressing state of the button; and a vibration motor fixed below the button. The frame is provided with a mounting hole penetrating through the frame, the frame includes an outer side surface and an inner side surface opposite to the outer side surface, the mounting hole penetrates through the outer side surface and the inner side surface, the button is mounted on the outer side surface, the vibration motor is suspended in the mounting hole, and the connection member is of a hollow ring structure and is fitted and fixed to an edge of the button. When the vibration motor of the portable device provides vibration, the vibration cannot be transferred to other areas of the portable device, thereby achieving better area vibration and more realistic tactile feedback experience of the button.

The above description merely describes some of, rather than all of embodiments of the present disclosure, and it can be understood that those skilled in the art can further make improvements without departing from a concept of the present disclosure, but all of these improvements shall fall within a scope of the present disclosure.

What is claimed is:

1. A portable device, comprising:

a frame; a button fixed relative to the frame;

one piece of connection member fixedly connecting the button to the frame;

a sensor for detecting a pressing state of the button; and a vibration motor fixed below the button, wherein the frame is provided with a mounting hole penetrating through the frame, the frame comprises an outer side surface and an inner side surface opposite to the outer side surface, the mounting hole penetrates through both the outer side surface and the inner side surface, the button is mounted on the outer side surface, the vibration motor is suspended in the mounting hole, and the connection member is of a hollow ring and a sheet structure and is fitted and fixed to an edge of the button, the button is stacked on the connection member, the connection member locates on the outer side surface to cover the mounting hole of the frame.

2. The portable device as described in claim 1, wherein the connection member is an elastic piece or a silicone pad.

3. The portable device as described in claim 1, wherein the connection member comprises a pair of long axial edges and a pair of short axial edges, and a width of each of the pair of short axial edges is greater than a width of each of the pair of long axial edges.

4. The portable device as described in claim 1, wherein the vibration motor comprises a housing fixed relative to the button, a coil fixed to the housing, a vibrator suspended in the housing, and an elastic connection part elastically connecting the vibrator to the housing.

5. The portable device as described in claim 4, wherein an end of the elastic connection part carries the vibrator, another end of the elastic connection part is connected to the housing, and a vibrating direction of the vibrator is parallel to a direction of a pressing force for pressing the button.

6. The portable device as described in claim 5, wherein the vibrator comprises a mass block and a magnet assembly fixed to the mass block, and the magnet assembly partially extends into the coil.

7. The portable device as described in claim 4, wherein a side of the elastic connection part is fixedly connected to the vibrator, another side of the elastic connection part is fixedly connected to the housing, and a vibrating direction of the vibrator is perpendicular to a pressing force for pressing the button.

8. The portable device as described in claim 7, wherein the vibrator comprises a mass block and a magnet assembly fixed to the mass block, the coil comprises a pair of flat coils, and the magnet assembly is arranged above the coil.

9. The portable device as described in claim 1, wherein the sensor is of a sheet structure and is clamped between the vibration motor and the button.

10. The portable device as described in claim 1, wherein the outer side surface recessing to form a recess, and the connection member is fixed in the recess to cover the mounting hole.

* * * * *